(12) United States Patent
Sprecher, Jr.

(10) Patent No.: US 6,271,660 B1
(45) Date of Patent: Aug. 7, 2001

(54) PERMANENT MULTI-POLE POSITION MAGNET

(75) Inventor: Arnold F. Sprecher, Jr., Raleigh, NC (US)

(73) Assignee: MTS Sytems Corporation, Eden Prairie, MN (US)

( * ) Notice: Subject to any disclaimer, the term of this patent is extended or adjusted under 35 U.S.C. 154(b) by 0 days.

(21) Appl. No.: 09/330,974

(22) Filed: Jun. 11, 1999

(51) Int. Cl.[7] .................................................. G01B 7/14
(52) U.S. Cl. ........................... 324/207.13; 324/207.24; 73/290 V
(58) Field of Search .................. 324/207.13, 207.14, 324/207.12, 207.22, 207.24, 209, 235, 226, 262; 333/148; 73/290 V, 313, 314

(56) References Cited

U.S. PATENT DOCUMENTS

| | | | |
|---|---|---|---|
| 3,898,555 | * | 8/1975 | Tellerman ...................... 324/207.13 |
| 4,952,973 | * | 8/1990 | Jones et al. ........................... 355/84 |
| 4,958,332 | * | 9/1990 | Tellerman ........................... 367/140 |
| 5,196,791 | * | 3/1993 | Dumais ........................... 324/207.13 |
| 5,514,961 | * | 5/1996 | Stoll et al. ...................... 324/207.13 |
| 5,590,091 | * | 12/1996 | Gloden et al. ....................... 367/140 |

FOREIGN PATENT DOCUMENTS

94/10746 * 5/1994 (WO) .

* cited by examiner

*Primary Examiner*—Jay Patidar
*Assistant Examiner*—Reena Aurora
(74) *Attorney, Agent, or Firm*—David M. Ostfeld

(57) ABSTRACT

A precision permanent position magnet assembly for use with a magnetostrictive linear displacement transducer having a magnetostrictive waveguide to provide an enhanced return signal is disclosed. The North-South axes of the magnet assembly are perpendicular to the waveguide center line axis and preferably includes three bar-type permanent magnets in a side by side alternating polarity configuration spaced apart with the pole spacing being one-half the wavelength of the return signal imposed on the waveguide. Three sets of such magnets may be radially disposed at 120 degree increments in a non-magnetic carrier.

13 Claims, 5 Drawing Sheets

MP1 = a
MP2 = b + a′
MP3 = c + b′ + a″
MP4 = c′ + b″
MP5 = c″

PERMANENT MULTI-POLE POSITION MAGNET

BACKGROUND OF THE INVENTION

1. Field of the Invention

The present invention relates to a magnet assembly for use with an absolute linear displacement magnetostrictive position transducer. More particularly, the present invention relates to a precision permanent position magnet assembly used in conjunction with a magnetostrictive transducer to measure longitudinal displacement.

2. Background

Magnetostrictive displacement transducers, such as those manufactured by the MTS Systems Corporation are well known in the machine control industry. U.S. Pat. Nos. 3,898,555 to Tellerman, 4,952,973 to Tellerman, and 5,590,091 to Gloden and Sprecher, describe inventions using magnetostrictive technology. These measurement devices include a sonic waveguide assembly housed in a non-magnetic elongated tube with either integral electronic control circuitry or interfaces for the attachment of such circuitry. In normal operation, a short duration electric current pulse (nominally one to three microseconds) is applied to the head end of the magnetostrictively responsive waveguide portion of the waveguide assembly that creates a magnetic field surrounding the waveguide. The magnetic field of a permanent magnet positioned along the length of the active measurement region of the transducer interacts with the magnetic field surrounding the waveguide and causes a torsional strain wave response in the waveguide. The characteristics of the magnetostrictive waveguide material are such that first and second torsional responses propagate along the waveguide in each longitudinal direction away from the permanent position magnet at a gradient of approximately nine microseconds per inch, although the actual velocity varies with the composition of the waveguide material. In the usual application, the first torsional response travels towards the head or electronics end of the transducer where it is detected by a pick-up assembly including a sensor bound to the waveguide and in the MTS product by a tape surrounded by a pickup coil which is magnetically biased by a stationary permanent bias magnet. The sensing tape and pickup coil combination, or mode converter, converts mechanical, strain wave energy into electrical energy. A resulting electric signal is amplified and processed by an electronic circuit appropriate for the user's application. It is desirable to maximize the amplitude of the electric signal derived from the first strain response such that the electric signal-to-noise ratio of the transducer is also maximized. Any noise of whatever kind and from whatever source present in the electric signal has the potential to cause erroneous measurements and is, therefore, undesirable.

By electronically measuring the time period between the instant the electric current pulse is applied to the waveguide and the instant the first torsional response is detected at the pickup assembly and scaling this measurement by a known constant, in this case the velocity of propagation of the first torsional response along the waveguide, the longitudinal position of the permanent position magnet can be very precisely and very repeatably determined. In the usual application, this measurement is then used as a position detection means for controlling the operation of manufacturing equipment.

The second torsional response travels away from the head end of the transducer where the pickup assembly is housed and thus towards the other end of the waveguide, commonly referred to as the "damp end." This is typically an unwanted response that if not attenuated will be reflected back into the active measurement region of the transducer by the mechanism used to mount the waveguide into the waveguide assembly and housing, resulting in erroneous signal measurements. Therefore, the damp end of the transducer typically includes a braided, rubber, or other suitable damping material to reduce the amplitude of the second torsional response to a level that is difficult to detect and does not interfere with the normal operation.

Magnetostrictive transducers are used in many industrial applications. Certain applications require that the active measurement region be as large as possible in relationship to the overall length of the transducer assembly. Thus, it is often desirable to make the head and damp ends of a transducer assembly as short as possible so that measurements can be made in areas with limited space for mounting and operating transducers. The maximization of the active measurement region is hampered by such a requirement that the permanent position magnet be permitted to be in close proximity to the sensing tape and pickup coil, which are magnetically responsive by design. As the permanent position magnet is moved closer to the head end, this magnet's naturally occurring flux lines increasingly traverse the sensing tape, pickup coil, and flux lines of the bias magnet. The intersection of the flux lines of the permanent position magnet and the flux lines of the bias magnet causes a distortion or modulation in the normal patterns of the flux lines of both and causes an unpredictable change in the resulting electric signal. This change correspondingly results in less accurate position measurements when the permanent position magnet is near the head end of the transducer. The unpredictable changes in the electric signal diminish the accuracy of the overall system. Therefore, it is an object of the present invention to move the permanent position magnet closer to the tape, coil, and bias magnet, thereby maximizing the active measurement region.

A permanent position magnet assembly that appears similar to the present invention is disclosed in U.S. Pat. No. 5,514,961 to Stoll et al. However, the construction and object of the Stoll device are significantly different from the present invention. In the Stoll patent, the North-South alignment of the individual magnets comprising the assembly are aligned such that the North-South axes are parallel to the waveguide assembly. The object of Stoll is to provide a magnet assembly that, when used with a magnetostrictive transducer, causes the transducer to be substantially less susceptible to variations in the distance between the magnet assembly and the waveguide assembly. Some machine installations by design are unable to accurately control the positioning of the magnet assembly relative to the waveguide assembly. Stoll teaches a device that spreads the flux lines over a wider longitudinal surface of the waveguide assembly than is the normal case with a conventional magnet assembly. This arrangement causes the magnetic flux lines surrounding the magnet assembly to intersect the waveguide assembly at a lower field strength gradient than is exhibited by a conventional magnet assembly, and at a much lower field strength gradient than is exhibited by the present invention. While the Stoll invention achieves the object stated by Stoll, it is worse than a conventional position magnet assembly for the object stated for the present invention, and is therefore significantly worse than the precision permanent position magnet assembly that is the subject of this application.

It is a further object of the present invention to permit operation of a position magnet assembly within close proximity to the head end of the transducer.

It is another object of the present invention to miniaturize the size of the inner diameter of the opening in the permanent position magnet assembly.

It is another object of the present invention to lower jitter.

It is another object of the present invention to reduce tap sensitivity.

It is another object of the present invention to increase position accuracy detection.

It is another object of the present invention to raise the service temperature in which the invention may be used.

It is a further object of the present invention to permit longer transducers to be produced.

SUMMARY OF THE INVENTION

The present invention provides a precision permanent position magnet assembly for use with a magnetostrictive linear displacement transducer that will provide an enhanced return signal while simultaneously allowing maximization of the length of the active measurement region. The active measurement region is correspondingly enhanced by concentrating the flux lines of the permanent position magnet and reducing the distance the flux lines extend from the center of the permanent magnet assembly. In the present invention, the North-South axes are perpendicular to the center line axis of the waveguide. The present invention, in the preferred embodiment, arranges three bar-type permanent magnets in a side-by-side, alternating polarity configuration such that the axes of the center lines of the magnets are perpendicular to the axis of the center line of the waveguide. The magnetic flux lines resulting from this configuration are more spatially concentrated around the magnet assembly than is possible with a single magnet. To further increase the density of the flux lines crossing the waveguide, three sets of two or more magnets may be radially disposed at 120 degree increments in a non-magnetic carrier. The carrier plus the magnets comprise the precision position magnet assembly. While the preferred embodiment uses three magnet sets for the reasons stated, two magnet sets will improve the performance of a transducer system as will four or more magnet sets. As another preferred embodiment, a solid ring of magnetized material having the same orientation with regard to the central axis of the magnetostrictive waveguide may be used. Further, as another preferred embodiment of the present invention individual magnetized rings may be stacked over the magnetostrictive waveguide would have the same axis orientation with respect to the central axis of the magnetostrictive waveguide.

Because the gradient of the flux lines crossing the waveguide is significantly higher with the present invention than with a single pole magnet, an almost two-fold increase in the amplitude of the electric signal, and, correspondingly, an almost two-fold improvement in the signal-to-noise ratio may be realized. Concentrating the position magnet assembly's flux lines permits maximization of the active measurement region by allowing the magnet assembly in normal operation to be moved closer to the head end of the waveguide before the deleterious effects caused by the close proximity of the magnet assembly to the pickup assembly becomes significant enough to cause erroneous measurements.

While the present invention is more costly to produce than a conventional, single-pole permanent position magnet assembly, its cost can be justified in many applications because of the above-described benefits previously unattainable in the art. For cost-sensitive applications, a second embodiment of the present invention replaces the more expensive center magnet with a less expensive ferrous spacer. While this second configuration requires a greater longitudinal distance between the magnet assembly and the head of the transducer, it still provides a significant improvement over the performance available with a conventional magnet assembly.

DESCRIPTION OF THE DRAWINGS

For further understanding of the nature and objects of the present invention, reference should be had to the following detailed description and drawings in which like parts are given like reference numerals and wherein.

DETAILED DESCRIPTION OF THE PREFERRED EMBODIMENT

Figure 3:
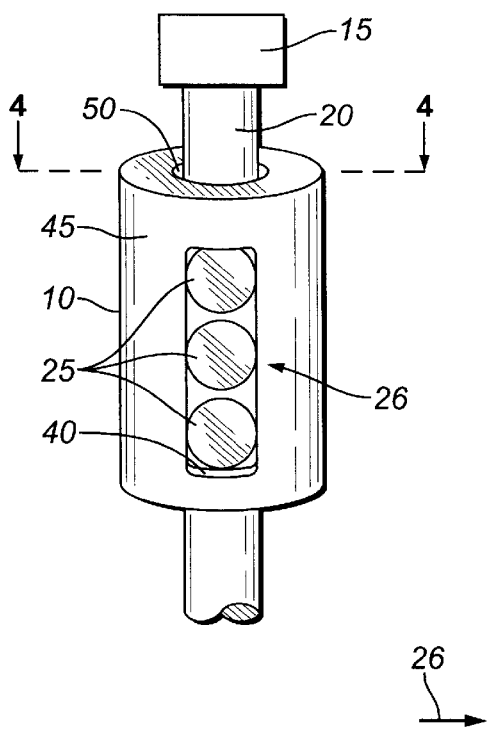
FIG. 3 shows the preferred embodiment of the permanent position magnet which would surround the magnetostrictive waveguide, including the non-magnetic carrier to hold the preferred embodiment of the present invention.
Figure 4:
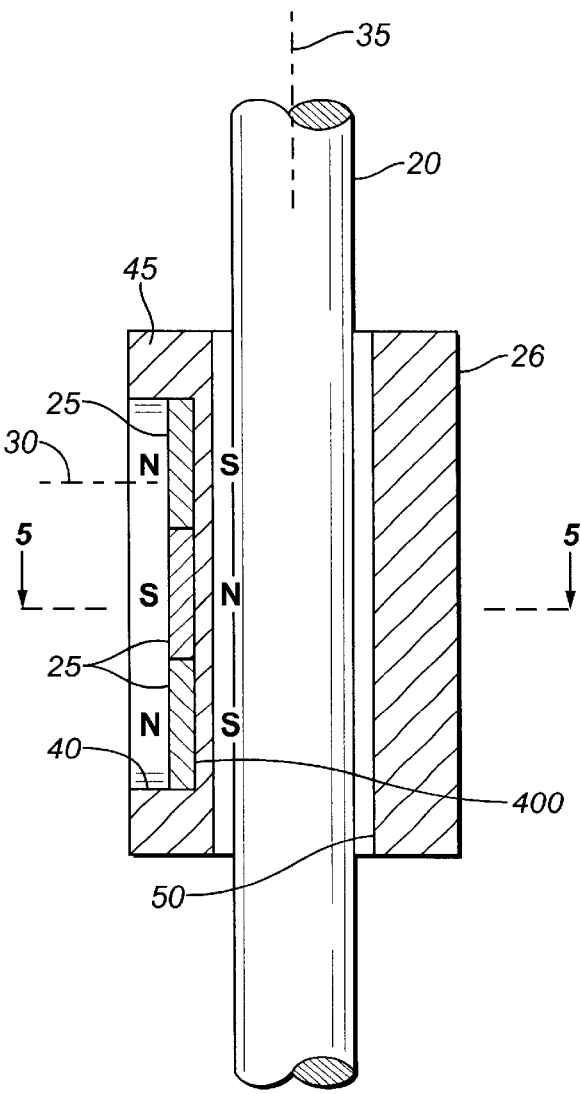
FIG. 4 shows a cross-sectional view of FIG. 3 taken along section lines 4—4 of FIG. 3.

A precision permanent position magnet assembly 10 for use with any magnetostrictive linear displacement transducer 15 of the prior art or future art having a magnetostrictive waveguide 20 is shown in FIG. 3. The active measurement region of precision permanent magnet assembly 10 is enhanced by concentrating the flux lines of the permanent position magnet assembly 10 and reducing the distance the flux lines extend from the center of the permanent magnet assembly 10. In the present invention, the North-South axes 30 are perpendicular to the axis 35 of the waveguide 20.

The present invention, in the preferred embodiment, includes three bar-type magnets 25 in a side-by-side, alternating polarity configuration 26 in the permanent position magnet assembly 10 such that the axes 30 of the center lines of the magnets 25 are perpendicular to the axis 35 of the center line of the waveguide 20. The sets 26 of permanent multi-pole position magnets of magnets 25 are arranged in grooves 40 in a non-magnetic carrier 45 of permanent position magnet assembly 10. The non-magnetic carrier 45 is in the shape of a cylinder or donut having an open interior chamber 50 sized to slidingly receive waveguide 20 therein.

Figure 1:
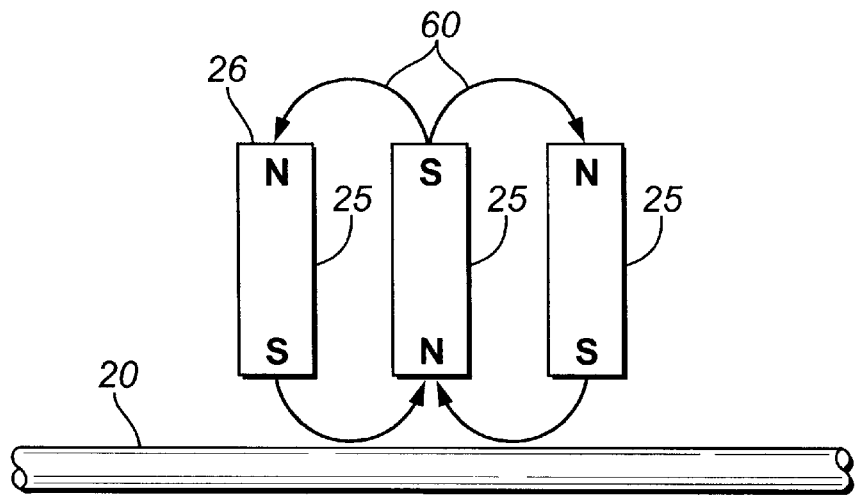
FIG. 1 shows a three-magnet multiple assembly of the preferred embodiment of the present invention, shown pictorially in relation to the waveguide.
Figure 2:
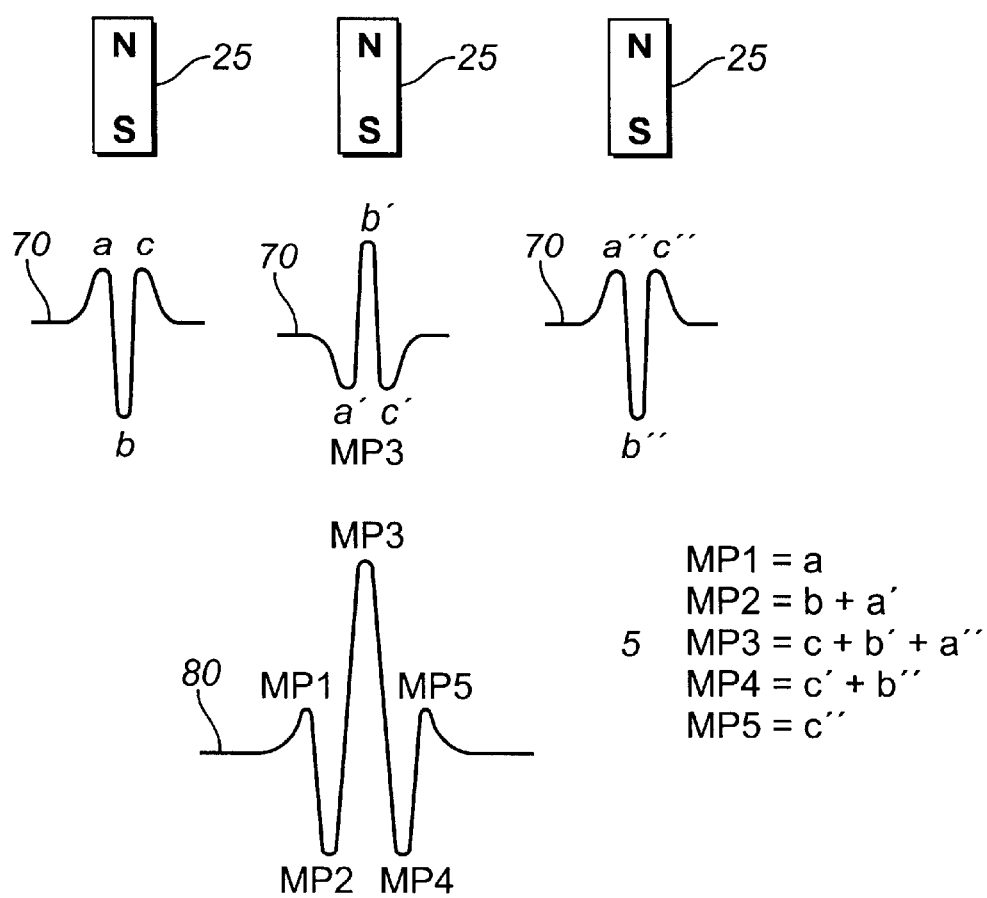
FIG. 2 shows the contribution of each magnet of the three magnet multiple assembly of FIG. 1 to the overall signal of the three magnets in response to magnetic field induced by the short duration electric current pulse.
Figure 5:
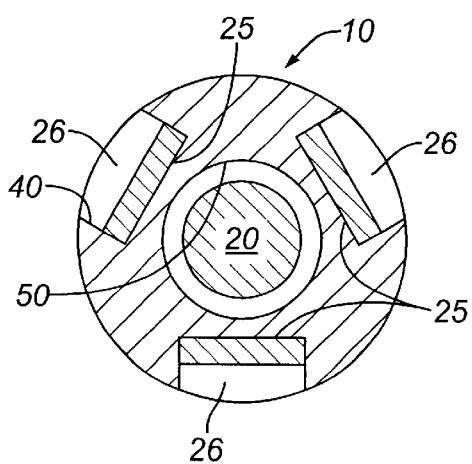
FIG. 5 shows a cross-sectional view of FIG. 4 taken along section lines 5—5 of FIG. 4.

As shown in FIG. 1, a permanent multi-pole position magnets assembly 26 has a center pole magnet 25 being a permanent magnet oriented such that its poles are of opposite polarity from each of its adjacent magnets 25. The center magnet 25 sharpens and defines the shape of the return flux lines 60 from the adjacent magnets 25. The spacing of the magnetic poles in any of the configurations 26 of magnets 25 is such that the pole spacing is one-half the wavelength of the return signal 70 (FIG. 2). This spacing sets up a magnetically resonant condition which superimposes the return signal lobes (one return signal 70 for each magnet pole 25) on each other to yield an approximate doubling of the final return signal 80, as shown schematically in FIG. 2. To further increase the density of the flux lines crossing the waveguide 20, three sets of a permanent multi-pole position magnet assembly 26 of two or more magnets 25 may be radially disposed at 120 degree increments in a non-magnetic carrier 45, as shown in FIG. 5. The carrier 45 plus the magnets 25 comprise the precision position magnet assembly 10.

Any of the 3 magnet arrangements of a permanent multi-pole position magnet assembly 26 provides a greater amplitude return signal 80 than is available from the conventional, single magnet position magnet assembly. As shown in FIG. 2, for resultant signal 80, the first lobe MP1 would be identical to the first lobe a of return signal 70 for the lead magnet 25. The second lobe MP2 would be a combination of the second lobe b of lead magnet 25 plus the first lobe a' of middle magnet 25. The third lobe MP3 would be the combination of the third lobe c of lead magnet 25 plus lobe b' of middle magnet 25 and a" of last magnet 25. The fourth lobe MP4 of signal 80 would be the last lobe of the middle magnet 25, c', the middle lobe b" of the last magnet 25 of set of a permanent multi-pole position magnet assembly 26. The final lobe MP5 would be the end lobe c" of the last magnet 25.

Thus, the spacing of the magnet poles sets up a magnetically resonant condition which superimposes the return signal lobes (one return signal for each magnet pole) on each other to yield an approximate doubling of the final return signal, as shown in FIG. 2.

The magnetic flux lines 60 resulting from this configuration are more spatially concentrated around the magnet assembly 10 than is possible with a single magnet 25, as shown in FIG. 1.

A doubling of the return signal amplitude 80 causes a corresponding doubling of the signal-to-noise ratio of the transducer 15. Any noise coexisting with the return signal 80 effectively modulates the return signal waveform 80 producing an instability often referred to as "jitter." As jitter increases, the accuracy of the transducer 15 measurement decreases. It is desirable to increase the signal-to-noise ratio as much as possible either by increasing the amplitude of the return signal, reducing the noise present in the system, or both. In addition, mechanical impact sensitivity or tap sensitivity is reduced because of the increased signal size to be able to distinguish from mechanical noise.

The increase in the amplitude of the return signal caused by the present invention permits the manufacturing of longer length transducers. A well-known characteristic of magnetostrictive waveguide assemblies is their attenuation of the amplitude of the return signal: The greater the distance the return signal 80 has to travel from the permanent position magnet assembly 10 to the head end 15, the greater the return signal 80 is attenuated. The present invention, by providing increased return signal amplitude from the transducer, permits the manufacture of longer effective transducers than conventional permanent position magnet assembly technology allows.

Another well-known characteristic of magnetostrictive waveguide assemblies is that their magnetostrictive responsiveness decreases when the ambient service temperature increases. By way of illustration, if a transducer with a position magnet secured to its waveguide assembly such that the magnet cannot move is placed into an oven, and the temperature of the oven is increased, the amplitude of the return signal will decrease. Because of the increased return signal level provided by the present invention, it is now possible to manufacture magnetostrictive transducers that will properly function at higher ambient service temperatures than previously attainable.

Further, operation of a position magnet assembly 10 within close proximity to the head end 15 of the transducer is achieved by controlling the flux lines 60 with the configuration of the permanent magnets 25 in the position magnet assembly 10. Because the magnet arrangement of this invention concentrates the flux lines 60 closer to the permanent multi-pole position magnet assembly 26 than is normally achieved with standard magnet configurations, the permanent multi-pole position magnet assembly 26 is positionally closer to the head 15. The gradient of the flux lines 60 crossing the waveguide 20 is significantly higher with the present invention than with a single pole magnet 25. This is the concentration of the permanent multi-pole position magnet assembly's 26 flux lines 60, and this also permits maximization of the active measurement region as discussed below by allowing the permanent multi-pole position magnet assembly 26 in normal operation to be moved closer to the head end 15 of the waveguide 20 before the dilatorious effects caused by the close proximity of the permanent multi-pole position magnet assembly 26 to the pick up assembly 15 becomes significant enough to cause erroneous measurements.

Miniaturization of the size of the inner diameter of the hole 50 in the permanent multi-pole position magnet assembly 26 can be achieved since the poles of the magnets 25 can be located in closer proximity to the waveguide 20 because the magnetic field lines 60 are restricted in space. Because the poles are near each other, the magnetic field lines 60 will reside closer to the magnetic surfaces. For a desired magnetic field strength, therefore, it is permissible to decrease the inner diameter of the opening 50 in the magnet assembly 10.

Figure 6:
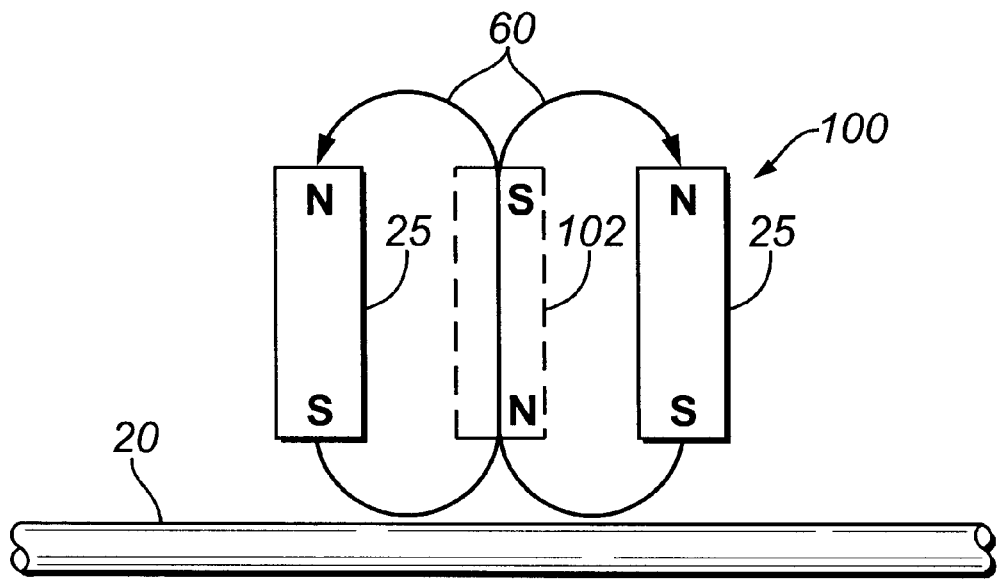
FIG. 6 illustrates an alternate embodiment of the present invention using two-magnet multipoles with a phantom center pole.
Figure 7:
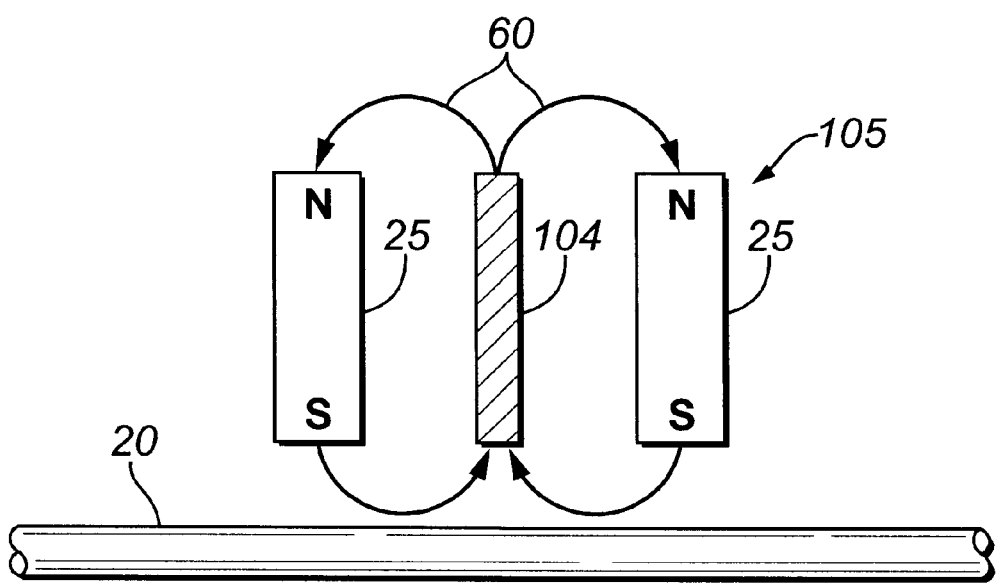
FIG. 7 shows an alternate embodiment of the two-magnet multipole assembly with a phantom center pole consisting of a ferrous pole piece.

While a preferred embodiment uses three magnet sets of permanent multi-pole position magnet assembles 26 for the reasons stated above, two magnet sets 100 will also improve the performance of a transducer system, as will four or more magnets sets. In FIG. 6, a two-magnet multipole assembly 100 with a phantom center pole 102 is shown. The phantom pole 102 is the result of the return flux lines 60 from the adjacent magnets 25. Alternatively, FIG. 7 shows a two-magnet multipole assembly 105 with a phantom center pole including a ferrous pole piece 104. The addition of the ferrous pole piece 104 further sharpens and defines the shape of the return flux line 60 from the adjacent magnets 25.

Figure 8:
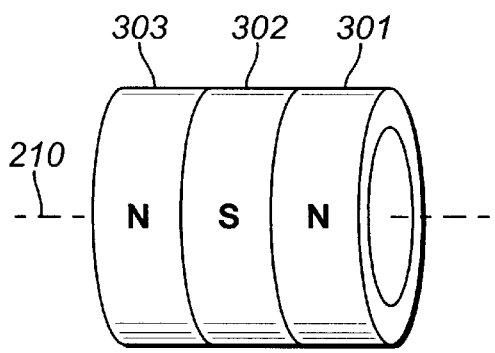
FIG. 8 shows a second preferred embodiment of a three-magnet multiple assembly of the present invention, shown pictorially in relation to the waveguide.
Figure 9:
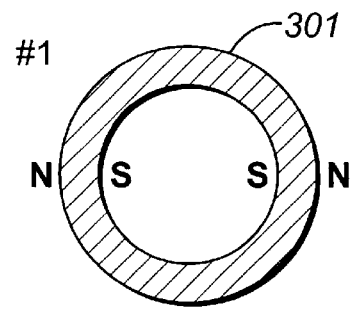
FIG. 9 shows an end view of the individual rings of FIG. 8.
Figure 9:
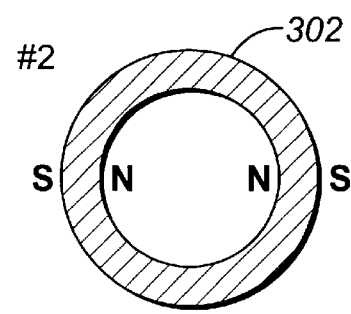
Figure 9:
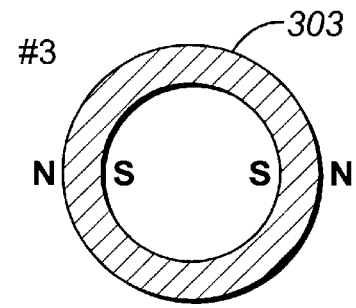
Figure 10:
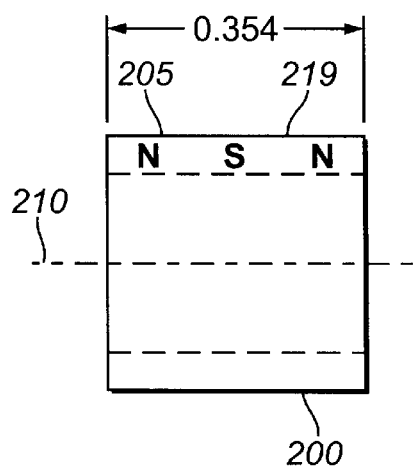
FIG. 10 shows a cross-section view of third preferred embodiment of a single structure having a three-magnet polarization of the present invention, shown pictorially in relation to the waveguide.
Figure 11:
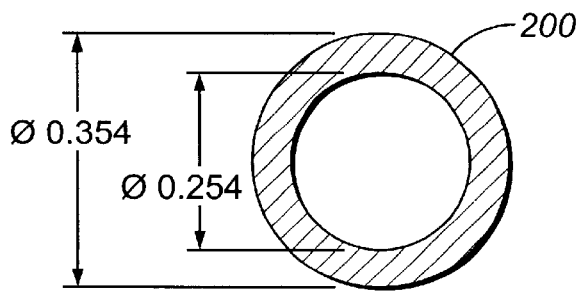
FIG. 11 shows an end view of the ring of FIG. 10.
Figure 13:
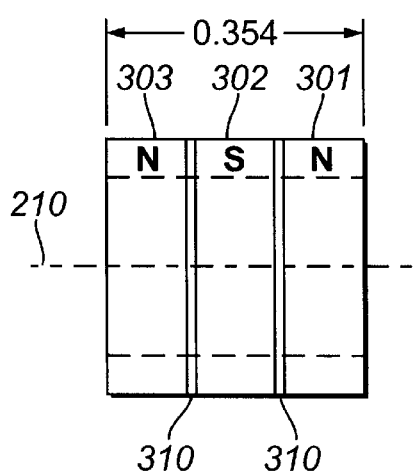
FIG. 13 shows a cross-section view of FIG. 12 taken along section lines 13—13 of FIG. 12.
Figure 12:
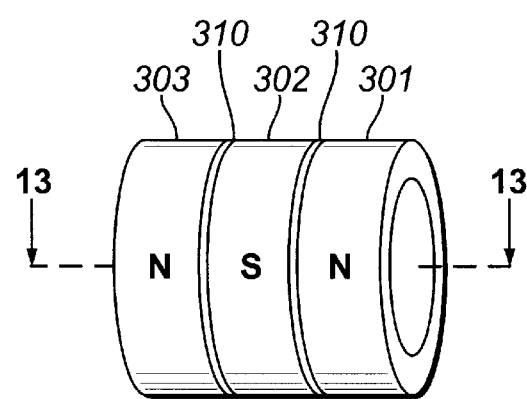
FIG. 12 shows a fourth preferred embodiment of a three-magnet multiple assembly of the present invention.
Figure 14:
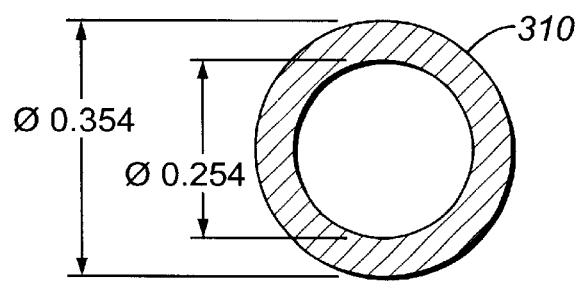
FIG. 14 shows an end view of the non-ferrous spacer of FIGS. 12 and 13.

As shown in FIGS. 10 and 11, instead of using three sets of bar type magnets 25, a full ring magnet 200 could be used. As shown in FIGS. 10 and 11, the ring 200 is cylindrical and is radially polarized 205 to have adjacent magnetic areas wherein the center area 219 is polarized exactly opposite to the two end areas. Thus, the axis for each of the poles of the magnet is still perpendicular to the center line axis of the magnetostrictive waveguide 210. Accordingly, there is no need then for a non-conductive carrier or indentations for the magnet material because the entire ring 200 is a monolithic magnet having the inverted polarizations. As another preferred embodiment in FIGS. 8 and 9, the three magnets may be embodied as three magnetic rings 301, 302, 303 with the center ring 302 having an opposite polarity to the two end rings 302, 303 and being radially polarized. Thus, the axis of the magnets is still perpendicular to the center line of the magnetostrictive material 210. In this preferred embodiment, the rings 301, 302, 303 would be stacked together over the magnetostrictive waveguide 210. As shown in FIGS. 12, 13, 14 in a final preferred embodiment, spacers 310 may be used in between the magnet rings 301, 302, 303 in order to adjust the wavelength spacing between the poles.

Because the present invention of a permanent multi-pole position magnet assembly 26 is more costly to produce than a conventional, single-pole permanent position magnet 25 assembly, its costs can be justified in many applications because of the above-referenced benefits previously unobtainable in the prior art. For cost-sensitive applications, the above alternate embodiments of the present invention replace the more expensive center magnet 25 with the less expensive ferrous spacer 104 of FIG. 7 or no spacer as shown in FIG. 6. While these alternate embodiments require a greater longitudinal distance between the magnet assembly 100 and the head of the transducer 15, it still provides a significant improvement over the performance available with a conventional magnet 25.

The composition of the magnets 25 or the magnet ring 200 or the magnet rings 300 varies depending on the distance required between the inner surface 400 of the magnets and the center 35 of the waveguide 20. The farther the surface 400 of magnet 25 is from the waveguide 20, the stronger the magnet 25 has to be and the more "exotic" the materials of construction required. For example, for magnets that are close to the waveguide 20, ferrite materials can be used. For magnets that are fairly far away from the waveguide 20, rare earth magnets are typically used because of the increased strength requirement.

All of the features of a particular preferred embodiment of the assembly are not shown in the above disclosure in order to emphasize the generality of the disclosure.

Because many varying and different embodiments may be made within the scope of the inventive concept herein taught including equivalent structures or materials hereafter thought of, and because modifications may be made in the embodiments herein detailed in accordance with the descriptive requirements of the law, it is to be understood that the details herein are to be interpreted as illustrative and not any limiting sense.

What is claimed in invention is:

1. A position magnet assembly for use with a magnetostrictive waveguide carrying return signals, comprising:
    a. at least one set of magnets positioned near the magnetostrictive waveguide said one set including two juxtaposed magnets having the same pole facing the magnetostrictive waveguide;
    b. the axes of the North-South poles of each of said magnets is perpendicular to the center line of the axis of the magnetostrictive waveguide;
    c. wherein said magnets are spaced along the waveguide such that the peak magnitude of a combined return signal resulting from interaction of said magnets with the waveguide is greater than the peak magnitude of either magnet return signal individually.

2. The assembly of claim 1, wherein there is included a non-magnetic carrier formed in a shape to surround the waveguide and said set of magnets is positioned in said carrier.

3. The assembly of claim 2, wherein there are three of said sets of magnets, each of said sets being disposed at approximate 120 degrees increments from the other of said sets in said carrier.

4. The assembly of claim 2, wherein said magnets are bar-type magnets having alternating polarity configurations.

5. The assembly of claim 1, wherein said set of magnets are included in a monolithic ring around the waveguide.

6. The assembly of claim 1, wherein said magnets are rings mounted around the waveguide and stacked adjacent to each other.

7. The assembly of claim 6, wherein there are included spacers between said rings.

8. The assembly of claim 1, wherein said set of magnets comprises at least three side-by-side permanent magnets, the outer two of said magnets having one North-South radial polarity and the center one of said magnets having the opposite North-South radial polarity.

9. The assembly of claim 1, wherein the magnetostrictive waveguide is damped at the foot end and has a reflection termination at the head end and wherein the pole spacing of said magnets is approximately one-half the wavelength of the return signal.

10. The assembly of claim 1, wherein each set of magnets comprises two magnets, said magnets arranged to yield a phantom center pole.

11. The assembly of claim 10, wherein there is included a ferrous pole piece, said ferrous pole piece being placed at the approximate position of said phantom center pole.

12. The assembly of claim 1, wherein each of said magnets is comprised of a rare earth material.

13. The assembly of claim 1, wherein each magnet is comprised of ferrite boron.

* * * * *